(12) United States Patent
Ikebe et al.

(10) Patent No.: US 7,273,286 B2
(45) Date of Patent: Sep. 25, 2007

(54) DISPLAY DEVICE AND LIGHT CONTROL METHOD OF THE SAME

(75) Inventors: Tomo Ikebe, Suwa (JP); Hiroyuki Hosaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 11/133,201

(22) Filed: May 20, 2005

(65) Prior Publication Data
US 2005/0275809 A1 Dec. 15, 2005

(30) Foreign Application Priority Data
Jun. 11, 2004 (JP) ............................. 2004-173898

(51) Int. Cl.
*G03B 21/20* (2006.01)
(52) U.S. Cl. .................... 353/85; 353/52; 353/119; 345/48; 345/46; 315/312; 315/360
(58) Field of Classification Search ................ 315/312, 315/316, 292, 295, 360, 362; 353/31, 57, 353/61, 85, 94, 119, 52, 69; 348/744; 362/85, 362/233, 800; 345/48, 46, 30
See application file for complete search history.

(56) References Cited

U.S. PATENT DOCUMENTS

| | | | |
|---|---|---|---|
| 6,166,496 A * | 12/2000 | Lys et al. .................. | 315/316 |
| 6,227,669 B1 * | 5/2001 | Tiao et al. .................... | 353/31 |
| 6,364,492 B1 * | 4/2002 | Fujimori et al. ............ | 353/119 |
| 7,052,138 B2 * | 5/2006 | Matsui ........................ | 353/31 |
| 2006/0226956 A1 * | 10/2006 | Young et al. .......... | 340/286.01 |

FOREIGN PATENT DOCUMENTS

| | | |
|---|---|---|
| JP | A 08-149494 | 6/1996 |
| JP | A 2002-333671 | 11/2002 |

* cited by examiner

*Primary Examiner*—Haissa Philogene
(74) *Attorney, Agent, or Firm*—Oliff & Berridge, PLC

(57) ABSTRACT

Aspects of the invention can provide a display device capable of providing stable light control with simplified control and structure. A display device can include light sources in which light control can be performed by controlling the operating conditions. The light sources can include a plurality of lamps having light-emitting diodes (LEDs), respectively. The display device can further include an outside-air temperature sensor that measures the temperature outside the casing in which the plurality of lamps are disposed, and a light-source control unit that controls the operating conditions of the lamps on the basis of the measurement of the outside-air temperature sensor.

12 Claims, 7 Drawing Sheets

RELATIONSHIP BETWEEN JUNCTION
TEMPERATURE AND LUMINOUS CHARACTERISTIC
(ALUMINUM-GALLIUM-INDIUM-PHOSPHORUS-BASED LED,
CONSTANT CURRENT VALUE)

DISPLAY DEVICE AND LIGHT CONTROL METHOD OF THE SAME

BACKGROUND

Aspects of the invention can relate to a display device having a light source of which light control can be performed by controlling the condition of operation and its light control method.

Related art display devices for displaying images or pictures can include projectors that modulate the illumination light from a light source with an optical modulator (display element) and project its image on an enlarged scale. The related art projectors tend to cause a change in color of the display image depending on a change in the temperature of the light source. Accordingly, there has been proposed techniques of controlling the amount of light from the light source (hereinafter, referred to as light control) to correct the color of images or pictures depending on use environment and to obtain stable color reproducibility.

The related art light control techniques can include a technique of measuring the temperature of the light source (lamp) and controlling the operating condition of a liquid crystal panel that is an optical modulator on the basis of the measurement, thereby correcting the color temperature of the display image. See, for example, JP-A-8-149494.

Alternatively, there is also a related art technique of sensing the operating condition and the temperature of the light source and controlling the operating condition of an optical modulator (display element) and the operating condition of light-source cooling means on the basis of the measurement, thereby improving the color reproducibility of the display image. See, for example, JP-A-2002-333671.

SUMMARY

The related art technique of light control by controlling the operating condition of an optical modulator uses part of gradation produced by the optical modulator for color correction, thus causing a decrease in the number of expressible colors. Also, the related art technique of light control by controlling the operating condition of cooling means takes relatively much time to control the temperature of the light source by a cooling device, and so tends to cause a time lag in light control. To prevent it, the cooling device will be increased in size and the control will become complicated.

An aspect of the invention can provide a display device capable of stable light control and in which the control and the system structure can be simplified and its light control method. According to an aspect of the invention, there can be provided a first display device having a light source in which light control can be performed by controlling the operating condition, wherein the light source includes a plurality of lamps having light-emitting diodes. The display device can include an outside-air-temperature sensing device that measures the outside-air temperature of a casing in which the plurality of lamps are disposed, and a light-source control device that controls the operating conditions of the lamps on the basis of the measurement by the outside-air-temperature sensing device.

In the first exemplary device, the light source can include a plurality of lamps having light-emitting diodes (LEDs), in which light control is performed by controlling the operating conditions of the lamps (LEDs). Although the emission wavelength varies as the temperatures of the lamps change, causing a change in the condition of light control, the condition of light control can be corrected by controlling the operating conditions of the lamps. The measurement of the outside-air temperature can be used in controlling the operating conditions of the lamps, with attention to the fact that, particularly when the light source is formed of lamps having LEDs, the temperatures of the lamps (LEDs) in the casing change with a change in outside-air temperature. In the first exemplary device, the operating conditions of the lamps can be controlled on the basis of the measurement of the outside-air temperature, so that stable light control can be achieved. In the first exemplary display device, light control can be performed only by controlling the operating conditions of the light sources (LEDs), and so the control and device structure can be simplified as compared with the technique of controlling a light modulator (display element) and cooling device.

Preferably, the first device can further include a counter circuit that counts the accumulated operating time of the lamps, wherein the light-source control device controls the operating conditions of the lamps on the basis of the measurement by outside-air-temperature sensing device and the accumulated operating time of the lamps. Specifically, an LED is known to change in characteristic depending on the accumulated operating time. Thus, by controlling the operating conditions of the lamps on the basis of the accumulated operating time of the lamps in addition to the measurement of the outside-air temperature, stable long-time light control can be achieved.

According to another exemplary aspect of the invention, there can be provided a second display device having a light source in which light control can be performed by controlling the operating condition, wherein the light source includes a plurality of lamps having light-emitting diodes. The display device can include an outside-air-temperature sensing device that measures the outside-air temperature of a casing in which the plurality of lamps are disposed, an operating-condition sensing device that senses the operating condition of at least one of the plurality of lamps, and a light-source control device that controls the operating conditions of the other lamps on the basis of the measurement by outside-air-temperature sensing device and the measurement by the operating-condition sensing device.

In the second exemplary device, as in the first exemplary device, the light source can include a plurality of lamps having light-emitting diodes (LEDs), in which light control is performed by controlling the operating condition of the lamps (LEDs). Although the emission wavelength varies as the temperatures of the lamps change, causing a change in the condition of light control, the condition of light control can be corrected by controlling the operating conditions of the lamps. In the second device, the operating conditions of the lamps are controlled on the basis of the measurement of the outside-air temperature, as in the first device, so that stable light control can be provided, and the control and device structure can be simplified. In the second display device, the operating conditions of the other lamps are controlled on the basis of the sensed operating condition of at least one of the lamps and as such, the balance of the intensities of the lamps can be maintained in a desired condition.

Preferably, the second device can further include a counter circuit that counts the accumulated operating time of the lamps, wherein the light-source control device controls the operating conditions of the other lamps on the basis of the measurement by outside-air-temperature sensing device, the measurement by the operating-condition sensing device, and the accumulated operating time of the lamps.

According to another aspect of the invention, there can be provided a third display device having a light source in which light control can be performed by controlling the operating condition, wherein the light source includes a plurality of lamps having light-emitting diodes. The exemplary display device can include lamp-temperature sensing device that measures the temperature of at least one of the plurality of lamps, operating-condition sensing device that senses the operating condition of the lamps, and light-source control device that controls the operating conditions of the other lamps on the basis of the measurement by the lamp-temperature sensing device and the measurement by the operating-condition sensing device.

In the third exemplary device, as in the first and second devices, the light source includes a plurality of lamps having light-emitting diodes (LEDs), in which light control is performed by controlling the operating condition of the lamps (LEDs). Although the emission wavelength varies as the temperatures of the lamps change, causing a change in the condition of light control, the condition of light control can be corrected by controlling the operating conditions of the lamps. In the third device, the operating conditions of the other lamps are controlled on the basis of the measurement of at least one of the lamps and the sensed operating conditions, so that the balance of the intensities of the lamps can be maintained in a desired condition and so stable light control can be provided. The temperature of the lamp (LED) may be measured directly or, alternatively, indirectly via cooling device and so on. The object of temperature measurement may not necessarily be all of the lamps but may be at least one lamp, thus avoiding the complication of the control and system structure associated with measurement of the temperature of the lamps.

Preferably, the third device further includes a counter circuit that counts the accumulated operating time of the lamps, wherein the light-source control means controls the operating conditions of the other lamps on the basis of the measurement by the lamp-temperature sensing device, the measurement by the operating-condition sensing device, and the accumulated operating time of the lamps, thereby enabling a long-term stable light control.

According to an exemplary aspect of the invention, there can be provided a first method of controlling the light of a display device having a light source in which light control can be performed by controlling the operating condition, wherein the light source includes a plurality of lamps having light-emitting diodes. The method can include measuring the outside-air temperature of a casing in which the plurality of lamps are disposed, wherein the operating conditions of the lamps is controlled on the basis of the measurement of the outside air.

In the first exemplary method, the operating conditions of the lamps are controlled on the basis of the measurement of the outside-air temperature, so that stable light control can be provided. The light control can be performed only by controlling the operating conditions of the light source (LEDs), and so the control and device structure can be simplified as compared with the technique of controlling a light modulator (display element) and cooling device.

Preferably, in the first method, the accumulated operating time of the lamps is counted, wherein the operating conditions of the lamps are controlled on the basis of the measurement of the outside air and the accumulated operating time of the lamps, thereby enabling a long-term stable light control.

According to an aspect of the invention, there can be provided a second method of controlling the light of a display device having a light source in which light control can be performed by controlling the operating condition, wherein the light source includes a plurality of lamps having light-emitting diodes, and wherein the method comprises measuring the outside-air temperature of a casing in which the plurality of lamps are disposed, and sensing the operating condition of at least one of the plurality of lamps, wherein the operating conditions of the other lamps are controlled on the basis of the measurement of the outside air and the sensed result of the operating condition.

In the second exemplary method, the operating conditions of the lamps are controlled on the basis of the measurement of the outside-air temperature, as in the first method, so that stable light control can be provided. Also, the light control can be performed only by controlling the operating conditions of the light source (LEDs), and so the control and device structure can be simplified as compared with the technique of controlling a light modulator (display element) and cooling device. In the second method, the operating conditions of the other lamps are controlled on the basis of the sensed operating condition of at least one of the lamps, so that the balance of the intensities of the lamps can be maintained in a desired condition.

Preferably, in the second exemplary method, the accumulated operating time of the lamps are counted and the operating conditions of the other lamps are controlled on the basis of the measurement of the outside air, the sensed operating condition, and the accumulated operating time of the lamps, so that stable long-time light stable control can be provided.

According to another exemplary aspect of the invention, there is provided a third method of controlling the light of a display device having a light source in which light control can be performed by controlling the operating condition, wherein the light source includes a plurality of lamps having light-emitting diodes. The method can include measuring the temperature of at least one of the plurality of lamps and sensing the operating condition of the one lamp, wherein the operating conditions of the other lamps are controlled on the basis of the measurement of the temperature of the lamp and the sensed result of the operating condition.

In the third exemplary method, as in the first and second exemplary methods, the operating conditions of the lamps are controlled on the basis of the measurement of the outside-air temperature, so that stable light control can be provided, and the light control can be performed only by controlling the operating conditions of the light source (LEDs), and so the control and device structure can be simplified as compared with the technique of controlling a light modulator (display element) and cooling device. Also, in the third method, the operating conditions of the other lamps are controlled on the basis of the measurement of temperature of at least one of the lamps and the sensed operating condition, so that the balance of the intensities of the lamps can be maintained in a desired condition, and so stable light control can be provided. The object of temperature measurement may not necessarily be all of the lamps but may be at least one lamp, thus avoiding the complication of the control and system structure associated with measurement of the temperature of the lamps.

Preferably, in the third method, the accumulated operating time of the lamps is counted and the operating conditions of the other lamps are controlled on the basis of the measurement of the temperature of the lamps, the sensed operating condition, and the accumulated operating time of the lamps, so that stable long-time light control can be provided.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

The invention is described below based on exemplary embodiments, with reference to the attached drawings.

Figure 1:
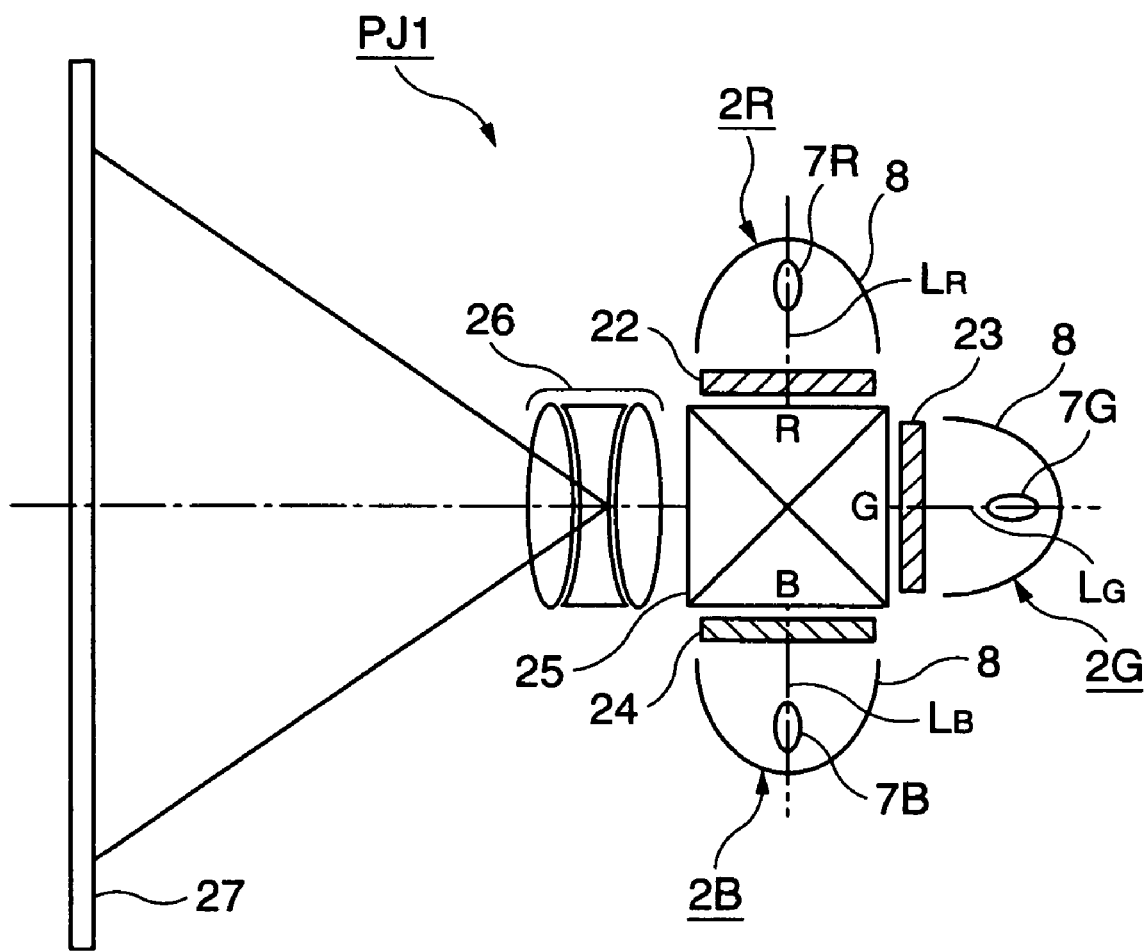
FIG. 1 is an exemplary schematic diagram of a projector according to a first embodiment of the invention.

FIG. 1 is a schematic diagram of a projection display device (projector) according to a first exemplary embodiment of the display device of the invention. A projector PJ1 shown in the drawing includes light sources 2R, 2G, and 2B capable of emitting different color lights, respectively, liquid-crystal light valves (light modulating means) 22 to 24, a dichroic prism 25, and a projection system 26. Reference numeral 27 denotes a screen on which images are projected.

The light source 2R includes an LED lamp 7R that emits red light LR and a reflector 8 that reflects the light from the LED lamp 7R. The light source 2G includes an LED lamp 7G that emits green light LG and a reflector 8 that reflects the light from the LED lamp 7G. The light source 2B includes an LED lamp 7B that emits blue light LB and a reflector 8 that reflects the light from the LED lamp 7B. The LED lamps 7R, 7G, and 7B include light-emitting diodes (LEDs) that emit the respective color lights.

The light sources 2R, 2G, and 2B are provided to correspond to the liquid-crystal light valves (light modulating means) 22, 23, and 24, respectively. The red light LR emitted from the light source 2R enters the red-light liquid-crystal light valve 22, where it is modulated. The green light LG emitted from the light source 2G enters the green-light liquid-crystal light valve 23, where it is modulated. The blue light LB emitted from the light source 2B enters the blue-light liquid-crystal light valve 24, where it is modulated.

The three color lights modulated by the liquid-crystal light valves 22 to 24 are incident on the cross dichroic prism 25, where the three color lights are combined to form light that expresses a color image. The combined light is projected onto the screen 27 by the projection system 26 that includes projection lenses and as such, an enlarged image is projected.

Figure 2:
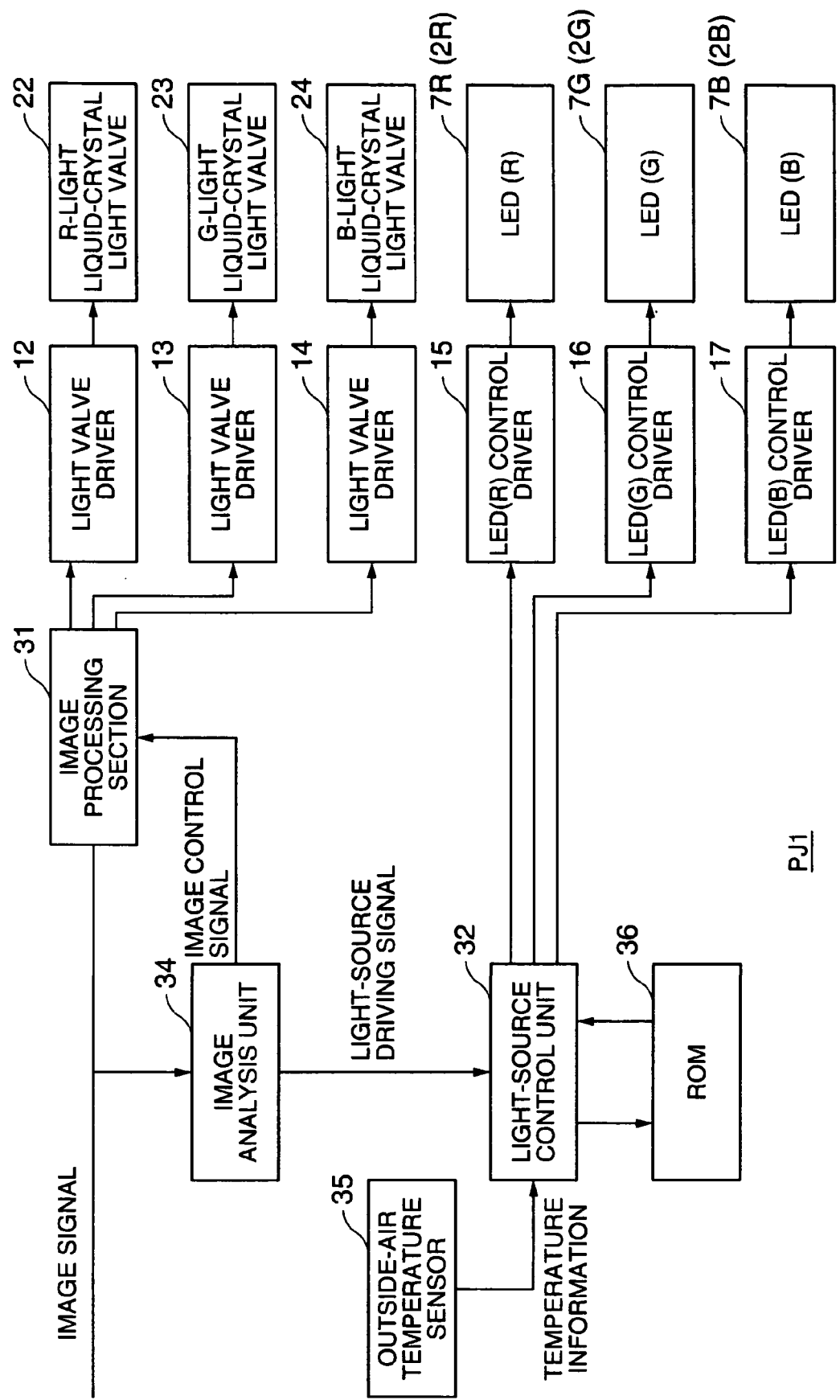
FIG. 2 is an exemplary block diagram of the drive circuit of the projector shown in FIG. 1.

FIG. 2 is an exemplary block diagram of the drive circuit of the projector PJ1 shown in FIG. 1. In FIG. 2, an image processing section 31 that applies a specified image processing to the color lights is connected to the liquid-crystal light valves 22 to 24. An image signal subjected to the specified image processing by the image processing section 31 is sent to the liquid-crystal light valves 22 to 24 via light valve drivers 12 to 14, respectively.

A light-source control unit (light-source control device) 32 and an image analysis unit 34 are connected to the LED lamps 7R, 7G, and 7B via LED-control drivers 15 to 17, respectively, in which a light-source drive signal is supplied to the light-source control unit 32 according to the analysis of the image signal by the image analysis unit 34.

To the light-source control unit 32, an outside-air temperature sensor 35 for measuring outside-air temperature is connected. The outside-air temperature sensor 35 can measure the temperature (outside-air temperature) outside a casing (not shown) in which the LED lamps 7R, 7G, and 7B are accommodated. The outside-air temperature sensor 35 may be various known temperature sensors, such as a thermocouple. The light-source control unit 32 controls the outputs of the LED lamps 7R, 7G, and 7B on the basis of the measurement of the outside-air temperature sensor 35.

The projector PJ1 according to the exemplary embodiment displays images through the image processing by the image processing section 31 and the output control (light control) for the LED lamps 7R, 7G, and 7B by the image analysis unit 34 and the LED-control drivers 15 to 17.

Now a light control method applied to the projector PJ1 of this embodiment will be described.

An image signal is first inputted to the image processing section 31 and the image analysis unit 34. The image analysis unit 34 analyzes the image signal to calculate image-processing parameters, such as an extension coefficient and an offset value, and sends the information to the image processing section 31 as an image control signal. The image processing section 31 applies a specified image processing to the image signal according to the received image control signal and then inputs the signal to the light valve drivers 12 to 14. The light valve drivers 12 to 14 control the liquid-crystal light valves 22 to 24 for the respective color lights according to the received image signal.

The image analysis unit 34 sends a light-source drive signal to the light-source control unit 32 on the basis of the analysis of the image signal. The light-source control unit 32 calculates the optimum driving current values for the LED lamps 7R, 7G, and 7B and provides the information to the LED-control drivers 15 to 17. The LED-control drivers 15 to 17 control the corresponding LED lamps 7R, 7G, and 7B on the basis of the received optimum driving current values to adjust the amount of light applied to the liquid-crystal light valves 22 to 24 (light control). By adjusting the amount of light applied to the liquid-crystal light valves 22 to 24, for example, the white balance of the projection image can be controlled.

Here, the amount of light denotes a light amount per unit time. Methods for varying the light amount can include a method of emitting light continuously while varying the intensity of light emitted from the LED lamps 7R, 7G, and 7B, a method of varying the period of light emission with the intensity held constant, and a method of varying both of the intensity and period of light emission. In this exemplary embodiment, the amounts of light emitted from the LED lamps 7R, 7G, and 7B are changed by varying the intensity of light emitted from the LED lamps 7R, 7G, and 7B by controlling the driving currents.

In this exemplary embodiment, the calculation of the optimum driving current values by the light-source control unit 32 is based on the measurement of the outside-air temperature by the outside-air temperature sensor 35. Specifically, the light-source control unit 32 has an ROM 36

(flash ROM and so forth) in which a lookup table that provides information of the characteristics of the LED lamps 7R, 7G, and 7B, and so reads the respective optimum driving current values of the LED lamps 7R, 7G, and 7B based on the measurement by the outside-air temperature sensor 35 from the lookup table, and provides the information to the LED-control drivers 15 to 17.

The lookup table holds the information on the relationship between the outside-air temperature and the respective optimum driving current values of the LED lamps 7R, 7G, and 7B for each of the LED lamps 7R, 7G, and 7B. The information is acquired by measurement such as experiment. For example, the lookup table stores the respective optimum driving current values of the LED lamps 7R, 7G, and 7B in correspondence with a specified outside-air temperature (for example, every 1° C. or 5° C.) within a use temperature range. The calculation of the optimum driving current values is not necessarily by the method of using the data table but may be by inputting data to the expression of the relationship between the outside-air temperature and the optimum driving current value.

Figure 3:
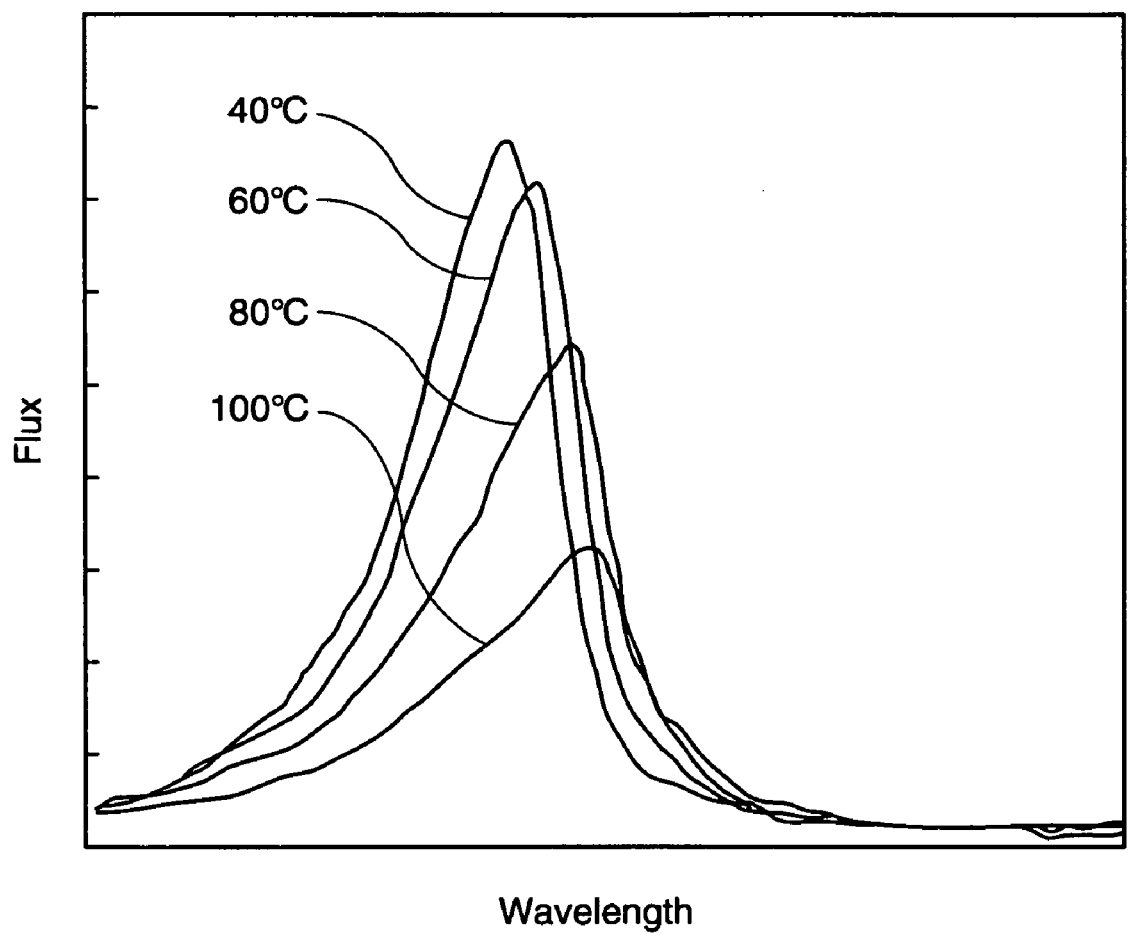
FIG. 3 is a graph showing the relationship between the temperature (junction temperature) and the luminous characteristic of an LED.

FIG. 3 is a graph showing the relationship between the temperature (junction temperature) and the luminous characteristic of an LED. As shown in FIG. 3, in general, the LED is decreased in emission output (Flux) and is increased in emission wavelength (Wavelength) with an increasing junction temperature. The luminous characteristics are different depending on the luminescent color. Accordingly, a light source having a plurality of LEDs corresponding to the colors R, G, and B, as in this embodiment, varies in the ratio of the light amounts as the junction temperature changes. This causes a change in white balance in color display.

Referring back to FIG. 2, the light-source control unit 32 controls the driving current values of the LED lamps 7R, 7G, and 7B into the optimum condition on the basis of the measurement of the outside-air temperature by the outside-air temperature sensor 35, as described above. The junction temperatures of the LED lamps 7R, 7G, and 7B generally depend on the outside-air temperature, so that the temperatures of the LED lamps 7R, 7G, and 7B in the casing vary according to the change in the outside-air temperature. Accordingly, even when the temperatures of the LED lamps 7R, 7G, and 7B vary, the change in the emission wavelength characteristics of the LED lamps 7R, 7G, and 7B associated therewith can be corrected by controlling the driving current values of the LED lamps 7R, 7G, and 7B into the optimum condition on the basis of the measurement of the outside-air temperature sensor 35. By independently controlling the light amounts (outputs) of the LED lamps 7R, 7G, and 7B, color correction (white balance) can be performed and the color reproducibility of the images or pictures can be maintained.

The projector PJ1 according to the exemplary embodiment performs light control only by controlling the operating conditions (driving current values) of the LED lamps 7R, 7G, and 7B. Accordingly, there is no need to allocate part of the halftone of the liquid-crystal light valves 22 to 24 for light control, thus reducing or preventing the complication of light control and a decrease in the number of expressible colors. Also, there is no need to control the cooling capacity for the LED lamps 7R, 7G, and 7B for the purpose of light control, thus preventing the complication of the cooling structure and cooling control of the light source. This is advantageous in reducing the cost of the display device. Furthermore, in this exemplary embodiment, the light control is performed only by controlling the operating conditions of the LED lamps 7R, 7G, and 7B, thus offering the advantage of avoiding needless consumption of electricity for light control.

The projector PJ1 according to the exemplary embodiment varies in emission wavelength as the temperatures of the LED lamps 7R, 7G, and 7B change to cause a change in the condition of light control. However, by controlling the driving currents of the LED lamps 7R, 7G, and 7B to the optimum values on the basis of the measurement of the outside-air temperature by the outside-air temperature sensor 35, the projector PJ1 can perform stable light control. The embodiment also offers the advantage of relatively simplifying the structure for temperature measurement not by using the temperature of the light source (LED lamp) but by using the measurement of the outside-air temperature.

A second exemplary embodiment of the invention will be described with reference to FIGS. 4 and 5. The principal structure of a projector PJ2 of this embodiment is the same as that of the projector PJ1 of the first exemplary embodiment. This embodiment further includes a counter circuit that counts the accumulated operating time of the LED lamps. The components described in the first embodiment are given the same reference numerals and their description is omitted or simplified hereinbelow.

Figure 4:
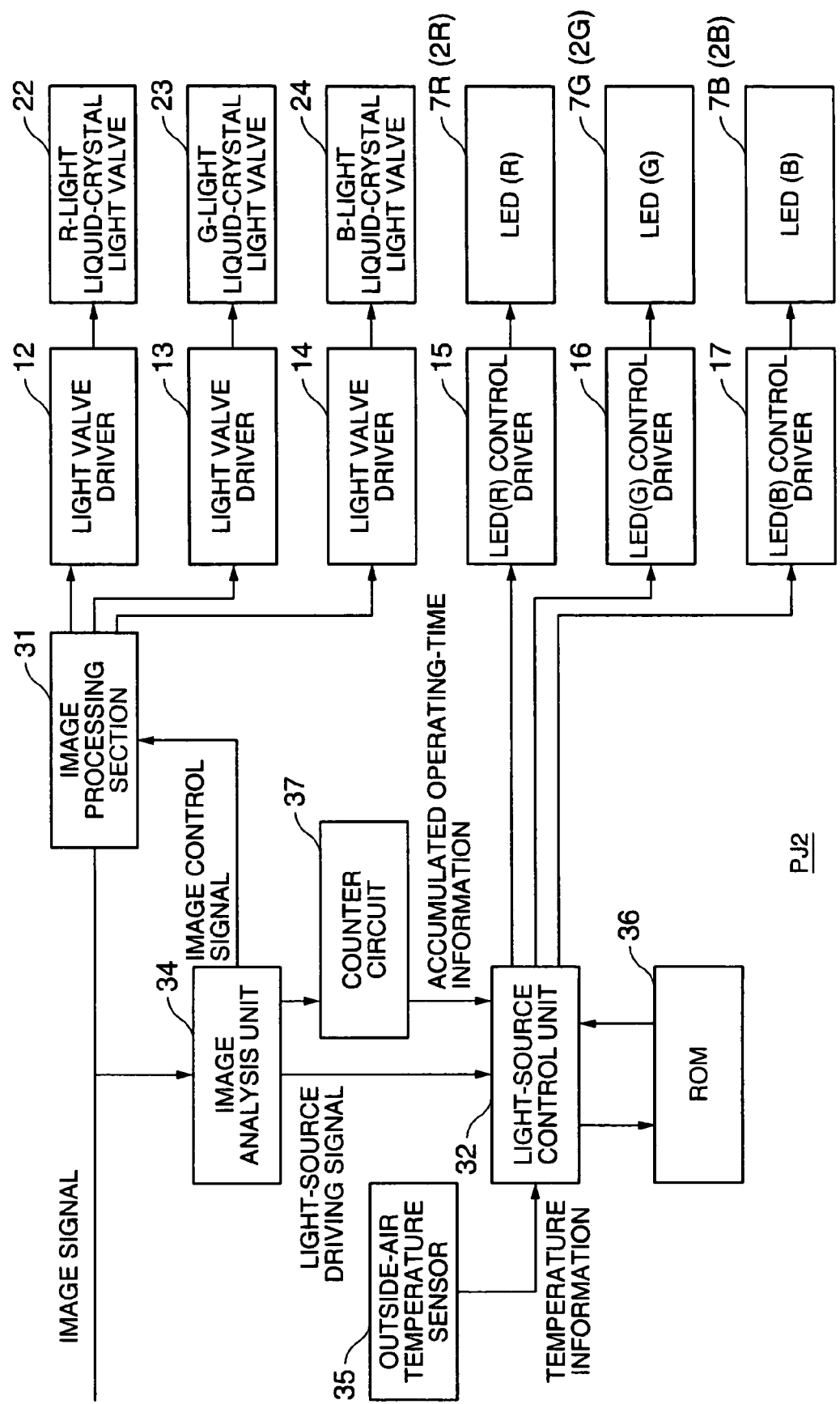
FIG. 4 is an exemplary block diagram of the drive circuit of a projector according to a second embodiment of the invention.

Referring to FIG. 4, the light-source control unit 32 connects to a counter circuit 37 that counts the accumulated operating time of the LED lamps 7R, 7G, and 7B. The counter circuit 37 accumulates the operating times of the LED lamps 7R, 7G, and 7B according to the light-source drive signal from the image analysis unit 34 and provides the information to the light-source control unit 32.

The light-source control unit 32 calculates the optimum driving current values of the LED lamps 7R, 7G, and 7B from the measurement of the outside-air temperature by the outside-air temperature sensor 35 and the information on the accumulated operating time sent from the counter circuit 37. Specifically, the ROM 36 of the light-source control unit 32 stores a lookup table in which the optimum driving current values of the LED lamps 7R, 7G, and 7B are held in correspondence with the outside-air temperature and the accumulated operating time. The light-source control unit 32 reads the respective optimum driving current values of the LED lamps 7R, 7G, and 7B corresponding to the outside-air temperature and the accumulated operating time from the lookup table and provides the information to the LED-control drivers 15 to 17, respectively.

Figure 5:
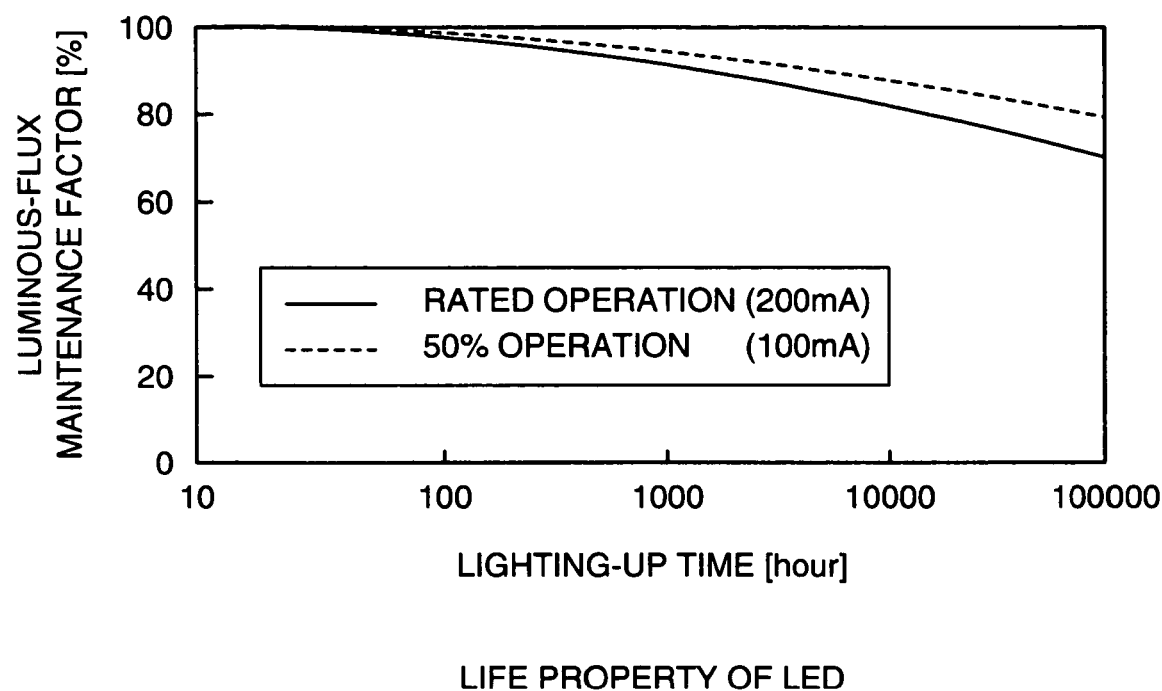
FIG. 5 is a graph showing the life property of an LED.

FIG. 5 is a graph showing the life property of an LED. As shown in FIG. 5, in general, LEDs are gradually decreased in light emission output (luminous-flux maintenance factor) with the lapse of operating time (lighting-up time). Also, such a luminous characteristic differs depending on the color of emission light. Accordingly, the light source including a plurality of LEDs corresponding to the colors R, G, and B, as in this exemplary embodiment, varies in the ratio of light amounts among the colors with operating time. This causes a change in white balance in color display, for example.

Referring back to FIG. 4, as described above, the light-source control unit 32 controls the operating conditions (driving current values) of the LED lamps 7R, 7G, and 7B on the basis of the accumulated operating time of the LED lamps 7R, 7G, and 7B in addition to the measurement of outside-air temperature. Thus, in addition to the correction of the change in the emission wavelength characteristics of the LED lamps 7R, 7G, and 7B with temperature change, the change in the emission wavelength characteristics of the LED lamps 7R, 7G, and 7B based on the life characteristics can be corrected.

This makes it possible for the projector PJ2 to perform stable light control for a long time.

It is possible to separately store the lookup table indicative of the optimum driving current values of the LED lamps 7R, 7G, and 7B corresponding to the outside-air temperature and the lookup table indicative the optimum driving current values of the LED lamps 7R, 7G, and 7B corresponding to the accumulated operating time.

A third exemplary embodiment of the invention will be described with reference to FIG. 6. The principal structure of a projector PJ3 of this embodiment is the same as that of the projector PJ1 of the first exemplary embodiment. This embodiment further includes operating-condition sensing device for sensing the operating condition of at least one of the plurality of LED lamps. The components described in the first embodiment are given the same reference numerals and their description is omitted or simplified.

Figure 6:
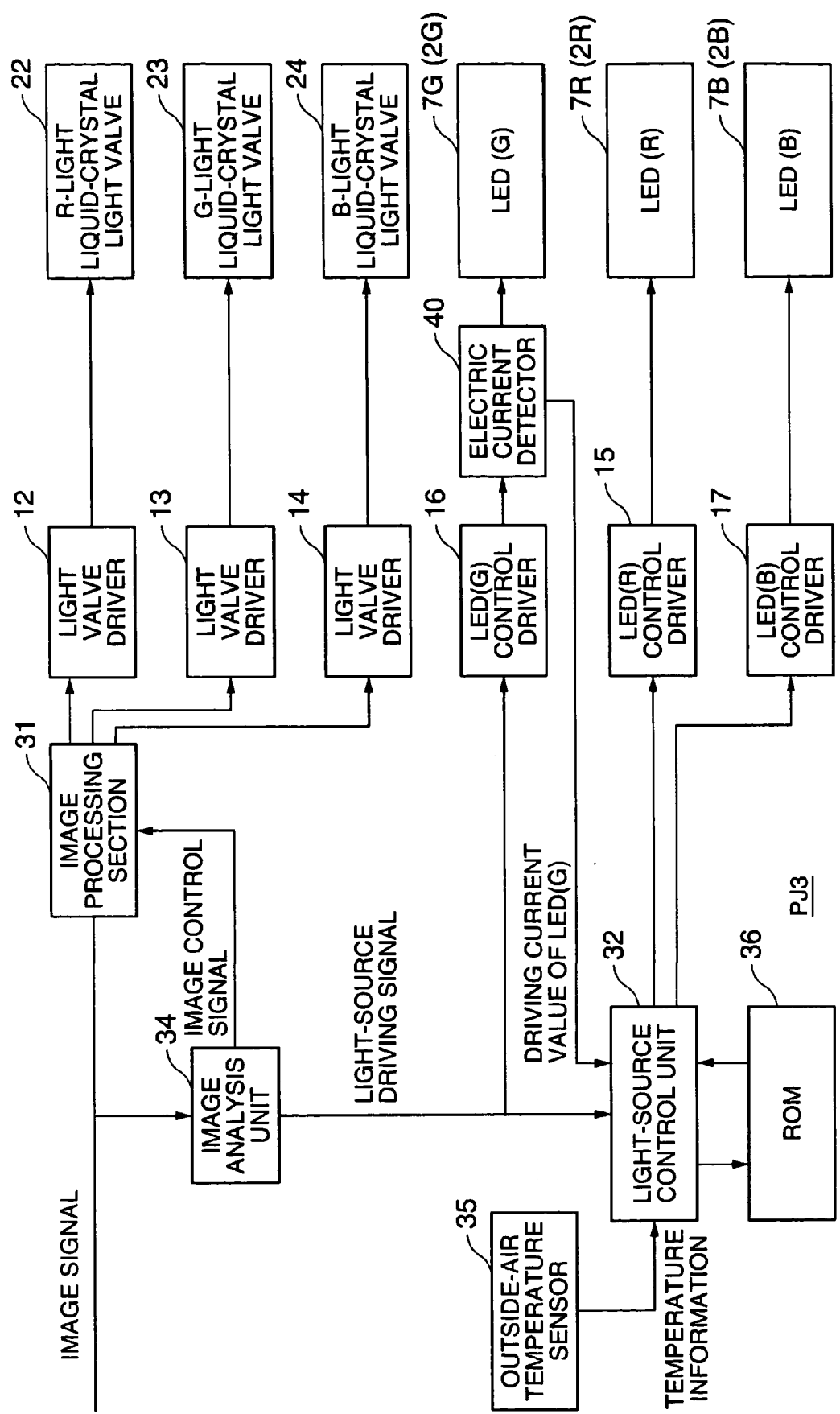
FIG. 6 is an exemplary block diagram of the drive circuit of a projector according to a third embodiment of the invention.

Referring to FIG. 6, an electric current detector 40 serving as operating-condition sensing device is disposed between the green-light LED control driver 16 and the LED lamp 7G. The electric current detector 40 measures the driving current value of the LED lamp 7G and provides the information to the light-source control unit 32.

The light-source control unit 32 calculates the optimum driving current values of the other LED lamps 7R and 7B from the measurement of the outside-air temperature by the outside-air temperature sensor 35 and the driving current value of the LED lamp 7G measured by the electric current detector 40. Specifically, the ROM 36 of the light-source control unit 32 stores a lookup table in which the respective optimum driving current values of the other LED lamps 7R and 7B are held in correspondence with the outside-air temperature and the driving current value of the LED lamp 7G. The light-source control unit 32 reads the respective optimum driving current values of the LED lamps 7R and 7B corresponding to the outside-air temperature and the driving current value of the LED lamp 7G from the lookup table and provides the information to the LED-control drivers 15 and 17, respectively, thereby controlling the operating conditions of the LED lamps 7R and 7B. Thus, the change in emission wavelength characteristics of the other LED lamps 7R and 7B with temperature change can be corrected with reference to the green-light LED lamp 7G.

Since the projector PJ3 of this exemplary embodiment controls the operating conditions of the other LED lamps 7R and 7B with reference to the operating conditions of the green-light LED lamp 7G, color correction such as white balance can be performed relatively easily and reliably by such relative control.

The reason that the green-light LED lamp is used as the reference for operation control in this embodiment is that, of the three colors R, G, and B, the output (intensity) of the green-light (G) LED is relatively low. The invention may not necessarily use the green-light LED lamp but may use the red-light or blue-light LED lamp or a combination thereof.

Also in this embodiment, as in the second embodiment, the operating conditions of the LED lamps 7R, 7G, and 7B may be controlled on the basis of the information obtained by counting the accumulated operating time of the LED lamps 7R, 7G, and 7B. This allows stable long-time light control.

Although, in this embodiment, the operating conditions (driving current values) of the LED lamps are sensed by the electric current detector, it should be understood that the method for sensing the operating conditions of the LED lamps are not limited to that. For example, the driving current values for the LED lamps may be obtained from the light-source driving signal.

A fourth exemplary embodiment of the invention will be described with reference to FIG. 7. The principal structure of a projector PJ4 of this embodiment is the same as those of the projector PJ1 of the first embodiment and the projector PJ3 of the third embodiment. This embodiment further includes lamp-temperature sensing device for sensing the temperature of one of the plurality of LED lamps in place of the outside-air-temperature sensing means (outside-air temperature sensor) for sensing the outside-air temperature. The components described in the first and third embodiments are given the same reference numerals and their description is omitted or simplified.

Figure 7:
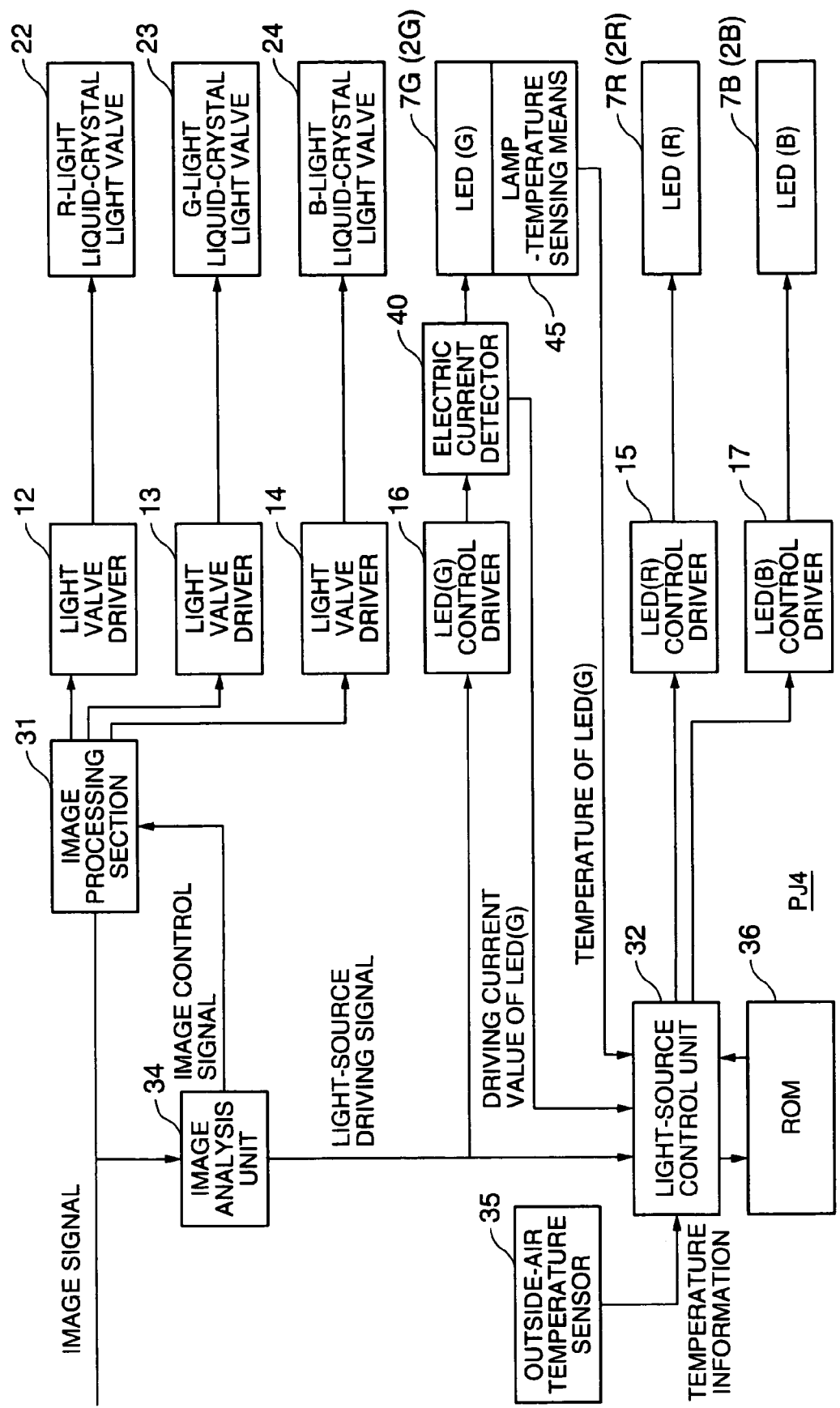
FIG. 7 is an exemplary block diagram of the drive circuit of a projector according to a fourth embodiment of the invention.

Referring to FIG. 7, the projector PJ4 can include a lamp-temperature sensing device 45 for sensing the temperature of the green-light LED lamp 7G. Various known temperature sensors such as a thermocouple may be used as the lamp-temperature sensing device 45. The temperature of the LED lamp 7G may be measured directly or, alternatively, indirectly via cooling means and so on. The measurement of the temperature of the LED lamp 7G by the lamp-temperature sensing device 45 is provided to the light-source control unit 32.

As in the third exemplary embodiment, the electric current detector 40 serving as operating-condition sensing means is disposed between the green-light LED control driver 16 and the LED lamp 7G. The electric current detector 40 measures the driving current value of the LED lamp 7G and provides its information to the light-source control unit 32.

The light-source control unit 32 calculates the optimum driving current values of the other LED lamps 7R and 7B from the measurement of the temperature of the LED lamp 7G by the lamp-temperature sensing means 45 and the driving current value of the LED lamp 7G measured by the electric current detector 40. Specifically, the ROM 36 of the light-source control unit 32 stores a lookup table in which the optimum driving current values of the other LED lamps 7R and 7B are held in correspondence with the temperature of the LED lamp 7G and the driving current value of the LED lamp 7G. The light-source control unit 32 reads the respective optimum driving current values of the other LED lamps 7R and 7B corresponding to the temperature of the LED lamp 7G and the driving current value of the LED lamp 7G from the lookup table and provides the information to the LED-control drivers 15 and 17, respectively, thereby controlling the operating conditions of the LED lamps 7R and 7B. Thus, the change in emission wavelength characteristics of the other LED lamps 7R and 7B with temperature change can be corrected with reference to the green-light LED lamp 7G.

Since the projector PJ4 of this exemplary embodiment controls the operating conditions of the other LED lamps 7R and 7B with reference to the green-light LED lamp 7G, color correction, such as white balance, can be performed relatively easily and reliably by such relative control.

In the projector PJ4 of this exemplary embodiment, not the outside-air temperature but the temperature of the LED lamp 7G is measured. This allows more accurate correction of the change in the emission wavelength characteristics of the LED lamps 7R, 7G, and 7B with temperature change. This is advantageous, for example, in the case in which the change in cooling capacity for the LED lamps 7R, 7G, and 7B is relatively high. The object of temperature measurement may not necessarily be all of the LED lamps 7R, 7G, and 7B but may be at least one (LED lamp 7G), thus avoiding the complication of the control and system structure associated with measurement of the temperature of the LED lamps.

Also in this embodiment, as in the second embodiment, the operating conditions of the LED lamps 7R, 7G, and 7B may be controlled on the basis of the information obtained by counting the accumulated operating time of the LED lamps 7R, 7G, and 7B. This allows stable long-time light control.

While, in the foregoing embodiments, the display device according to the invention has been described with reference to a projector (projection display device), it can also be applied to a direct-view display device.

Although the foregoing exemplary embodiments are provided with LED lamps for three colors R, G, and B as optical modulator, the invention is not limited to that but may have a plurality of LED lamps corresponding to two or less or four or more colors, or a plurality of LED lamps of the same color.

Although the foregoing exemplary embodiments use a liquid-crystal light valve as optical modulator, it is to be understood that a digital mirror device (DMD) may be used as optical modulator.

While the invention has been described in its preferred embodiments with reference to the attached drawings, it is to be understood that the invention is not limited to the exemplary embodiments. It is also to be understood by those skilled in the art that various changes and modifications may be made in the invention within the technical sprit and scope defined by the appended claims and that the invention naturally covers the changes and modifications.

What is claimed is:

1. A display device having a light source in which light control can be performed by controlling an operating condition, the light source including a plurality of lamps having light-emitting diodes, the display device comprising:
    an outside-air-temperature sensing device that measures an outside-air temperature of a casing in which the plurality of lamps are disposed;
    a counter circuit that counts an accumulated operating time of the lamps; and
    a light-source control device that controls operating conditions of the lamps on a basis of the measurement by the outside-air-temperature sensing device and the accumulated operating time of the lamps.

2. A projector having a light source in which light control can be performed by controlling an operating condition, the light source including a plurality of lamps having light-emitting diodes, the projector comprising:
    an outside-air-temperature sensing device that measures an outside-air temperature of a casing in which the plurality of lamps are disposed;
    a light-source control device that controls operating conditions of the lamps on a basis of the measurement by the outside-air-temperature sensing device; and
    a projection system that projects an image.

3. A display device having a light source in which light control can be performed by controlling an operating condition, the light source including a plurality of lamps having light-emitting diodes, and the display device comprising:
    an outside-air-temperature sensing device that measures an outside-air temperature of a casing in which the plurality of lamps are disposed;
    an operating-condition sensing device that senses operating condition of at least one of the plurality of lamps; and
    a light-source control device that controls the operating conditions of the other lamps on a basis of the measurement by outside-air-temperature sensing device and the measurement by the operating-condition sensing device.

4. The display device according to claim 3, further comprising:
    a counter circuit that counts an accumulated operating time of the lamps; and
    the light-source control device controls the operating conditions of the other lamps on the basis of the measurement by outside-air-temperature sensing device, the measurement by the operating-condition sensing device, and the accumulated operating time of the lamps.

5. A display device having a light source in which light control can be performed by controlling an operating condition, the light source includes a plurality of lamps having light-emitting diodes, the display device comprising:
    a lamp-temperature sensing device that measures a temperature of at least one of the plurality of lamps;
    an operating-condition sensing device that senses an operating condition of the lamps; and
    a light-source control device that controls the operating conditions of the other lamps on a basis of the measurement by the lamp-temperature sensing device and the measurement by the operating-condition sensing device.

6. The display device according to claim 5, further comprising:
    a counter circuit that counts accumulated operating time of the lamps; and
    the light-source control device controlling the operating conditions of the other lamps on the basis of the measurement by the lamp-temperature sensing device, the measurement by the operating-condition sensing device, and the accumulated operating time of the lamps.

7. A method of controlling light of a display device having a light source in which light control can be performed by controlling an operating condition, the light source including a plurality of lamps having light-emitting diodes, and the method comprising:
    measuring an outside-air temperature of a casing in which the plurality of lamps are disposed;
    counting an accumulated operating time of the lamps; and
    operating conditions of the lamps being controlled on a basis of the measurement of the outside air and the accumulated operating time of the lamps.

8. A image display device having a light source in which light control can be performed by controlling an operating condition, the light source including a plurality of lamps having light-emitting diodes, the image display device comprising:
    an outside-air-temperature sensing device that measures an outside-air temperature of a casing in which the plurality of lamps are disposed;
    a light-source control device that controls operating conditions of the lamps on a basis of the measurement by the outside-air-temperature sensing device; and
    a light modulating device that modulates the light emitted from the light source device based on the image.

9. A method of controlling the light of a display device having a light source in which light control can be performed by controlling an operating condition, the light source including a plurality of lamps having light-emitting diodes, the method comprising:

measuring an outside-air temperature of a casing in which the plurality of lamps are disposed;

sensing an operating condition of at least one of the plurality of lamps; and the operating conditions of the other lamps being controlled on a basis of the measurement of the outside air and the sensed result of the operating condition.

10. The method of controlling the light of a display device, according to claim 9, further comprising:

counting an accumulated operating time of the lamps; and the operating conditions of the other lamps being controlled on a basis of the measurement of the outside air, the sensed result of the operating condition, and the accumulated operating time of the lamps.

11. A method of controlling light of a display device having a light source in which light control can be performed by controlling an operating condition, the light source including a plurality of lamps having light-emitting diodes, the method comprising:

measuring a temperature of at least one of the plurality of lamps and sensing an operating condition of the one lamp; and the operating conditions of the other lamps being controlled on a basis of the measurement of the temperature of the lamp and the sensed result of the operating condition.

12. The method of controlling the light of a display device according to claim 11, further comprising:

counting an accumulated operating time of the lamps; and the operating conditions of the other lamps being controlled on the basis of the measurement of the temperature of the lamp, the sensed result of the operating condition, and the accumulated operating time of the lamps.

* * * * *